3,511,435
LAMINATED CONTAINER AND METHOD OF
MAKING A LAMINATED CONTAINER
Norman S. Hewitt, New Canaan, Conn., and Wesley D. Cawley, Port Neches, Tex., assignors to Continental Can Company, New York, N.Y., a corporation of New York
Filed Oct. 21, 1965, Ser. No. 500,123
Int. Cl. B65d 31/02; B65b 41/12
U.S. Cl. 229—55                                      21 Claims

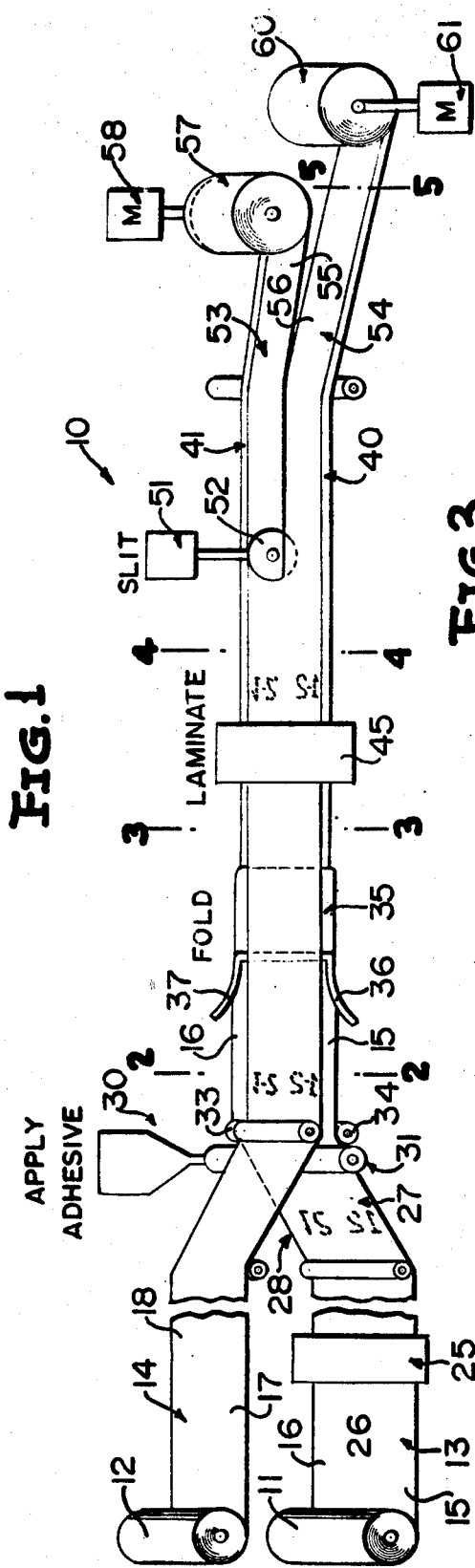

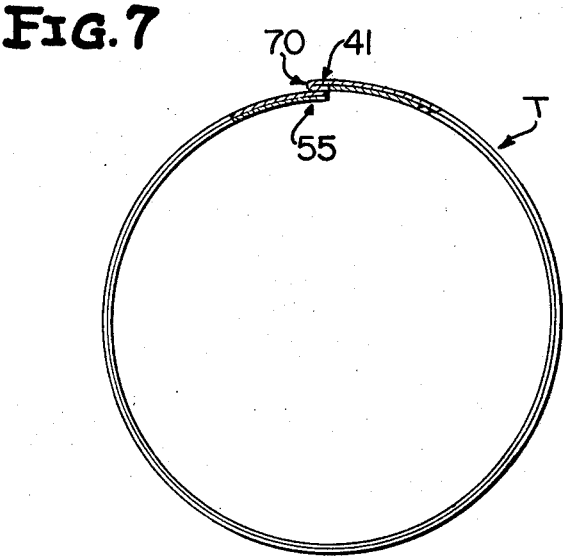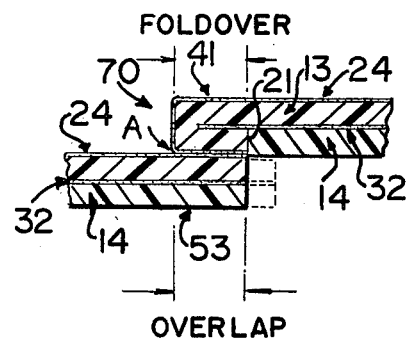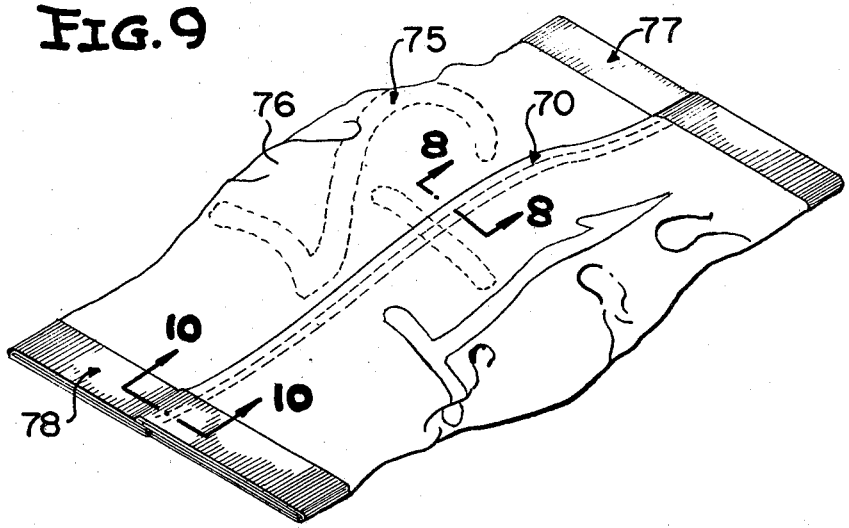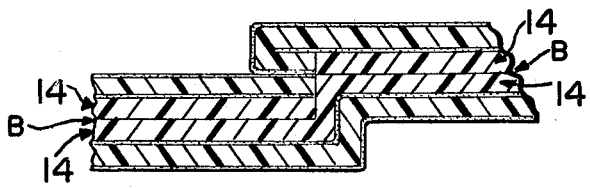

ABSTRACT OF THE DISCLOSURE

This disclosure relates to a novel laminated pouch and method of forming a laminated pouch by overlapping a longitudinal edge of a first web to bring its edge into abutting engagement with the edge of a second sheet, rolling the sheets into a roll which is of a generally uniform diameter throughout, subsequently unrolling the sheet, and forming the sheet into a seamed tube by heat sealing the folded edge to its opposite longitudinal edge.

It is conventional in the flexible packaging industry to laminate two or more webs of material to each other, form the laminated webs to a tubular configuration, longitudinally seam the tube, and thereafter transversely seam and sever the tube to form individual pouches. The webs are generally of equal width and, in those cases where the materials are cross-sealable, i.e., one web can be heat sealed to another web, the formation of longitudinal and transverse seams presents no major obstacle to the production of commercially acceptable pouches. As an example, when the longitudinal edges of a low density polyethylene-medium density polyethylene laminate are overlapped and heat sealed, a seam of high bond strength is obtained because these materials readily cross-fuse or cross-seal to one another.

The more difficult problem is that of fabricating pouches from laminates which are not cross-sealable or are cross-sealable to such a minor degree that commercially acceptable pouches cannot be formed therefrom. For example, cellophane and polyethylene are basically not cross-heat-sealable and upon the formation of a tube from a laminate of these materials the polyethylene and cellophane oppose one another at the interface of the lapped longitudinal edges. Upon the application of heat and pressure to the lapped edges of the tube no fusion nor negligible fusion occurs at the interface of the cellophane and polyethylene with the result that no bond is produced.

As is readily apparent, it is highly desirable to form pouches or similar containers from laminated materials in order to obtain the combined benefits of the physical and chemical characteristics of each which may not be available individually. For example, it is desirable in forming pouches to construct the outer ply from strong material to protect the packaged product during storage and handling while at the same time provide an inner ply which will not adversely affect or react with the product. In order to achieve the benefits afforded by laminated container structures, various methods have been employed to produce commercially acceptable laminated pouches.

One way of forming a pouch from laminated materials which are not heat-sealable to each other is to form the laminated material into a tubular configuration with the interior surfaces of the inner ply at the longitudinal edge portions in abutting relationship. In this case, the inner ply (polyethylene, for example) can be heat sealed to itself to form a longitudinal fin directed radially outwardly from the tube which is subsequently folded against the exterior surface of the outer ply. Fin seams are, however, undesirable from the standpoint of requiring a wider web of base material, producing a less esthetic appearing package, and precluding effective end seals due to the abrupt change in material thickness which effects heat transfer and pressure during a heat sealing operation.

Another manner of overcoming this problem is to stagger the longitudinal edges of the laminate transversely relative to each other. If, for example, a cellophane web having heat sealable coatings on each surface is laminated to a polyethylene web with the longitudinal edges staggered and is then formed into a tube, the heat sealable coatings of the cellophane at opposite longitudinal edges overlap each other as do the polyethylene edges. However, due to the drastically different temperatures and pressure required to heat seal the coated edges to each other and the polyethylene edges to each other, duplicate heat sealers would be necessary to form the seams. This duplication of equipment is, of course, highly undesirable. A second objection to this construction is that both edges of the webs when in roll form would not be tight and are readily damaged during storage and/or shipment.

Finally, since web material must be provided for two separate parallel seams, more total material is required than would be necessary for containers constructed from non-staggered webs.

In accordance with this invention the above and numerous other disadvantages in conventional laminating and pouch-forming methods have been overcome by feeding no less than two webs of material along a predetermined path in generally overlying relationship. At least one of these webs is constructed from heat-sealable material or has a heat-sealable coating, and one of the webs is slightly wider than the width of the other. Prior to the webs being laminated to each other a portion of the wider heat-sealable web projecting transversely beyond the narrower web is folded directly upon itself with an edge thereof in opposed relationship to an adjacent edge of the narrow web. The webs are then laminated, wound in rolls and subsequently shipped to a packager.

The packager produces pouches from the laminated web by introducing the laminated web into conventional forming apparatus which overlaps the folded edge of the heat-sealable material upon an opposite edge of the heat sealable material to form a longitudinally seamed tube upon the application of heat and pressure to the overlapped edges. Upon subsequent filling, and selective transverse sealing and severing, the longitudinally seamed tube is converted into a plurality of individually packaged pouches.

A major advantage of producing a laminated web in the manner just described is the ability to form a tightly wound roll of uniform configuration and devoid of loosely rolled edges which are readily torn or otherwise damaged when the rolls are stored or shipped. For example, in a roll formed of laminated material having staggered but unfolded longitudinal edges, the diameter of the roll is greater at its center than at axial edges thereof. In addition, the center portion of the roll is tightly wound while the axial edges are comparatively loosely wound due to the single ply thickness thereof, as opposed to the completely uniform thickness of the laminate of this invention and the uniformly contoured and wound roll formed therefrom.

The important advantage achieved during the actual formation of the laminated web into pouches is the ability to produce a strong heat seal at the interface of the overlapped heat sealable material.

In keeping with the above, it is a primary object of this invention to provide a novel method which overcomes the above and other disadvantages of known laminating methods to produce a laminated web of uniform thickness, a roll of uniform dimensions and pouches having longitudinal heat sealed seams even though the materials forming the pouches are not cross-heat sealable.

A further object of this invention is to provide a novel method of laminating at least two webs of material including the steps of providing first and second webs each having respective first and second longitudinal edge portions terminating in free longitudinal first and second edges, folding the longitudinal edge portions of the first web upon themselves with the edges thereof in opposing relationship, assemblying the first and second webs in overlying relationship with the first and second longitudinal edges of the second web projecting transversely beyond the respective first and second edges of the first web, transversely foreshortening the second web whereby the first and second edges thereof are brought into opposing butt relationship to the respective first and second edges of the first web, joining the webs together, and slitting the webs medially of the longitudinal edges to transform the laminated webs into a pair of identical individual webs.

A further object of this invention is to provide a novel method of forming a laminated tube from a laminated web formed in accordance with the object immediately above set forth by forming the laminated web into a tube with the folded longitudinal edge portion contacting an opposite longitudinal edge portion of the same web, and heat sealing the contacting edge portions to form a longitudinally heat-sealed seamed tube.

Another object of this invention is to provide a novel laminated container constructed from a tube formed in accordance with the previous object by additionally transversely heat-sealing and severing the tube during the packaging of a product therein to form a plurality of individually packaged container-like structures.

With the above, and other objects in view that will hereinafter appear, the nature of the invention will be more clearly understood by reference to the following detailed description, the appended claims and the several views illustrated in the accompanying drawings:

In the drawings:

FIG. 1 is a highly schematic illustration of apparatus for forming a laminate in accordance with this invention, and illustrates means for folding longitudinal edges of a web of heat-sealable material upon themselves prior to the lamination of a narrow web of material thereto.

FIG. 2 is an enlarged sectional view taken generally along line 2—2 of FIG. 1, and illustrates the relative position of lower webs and upper webs which are not cross-sealable prior to being laminated together.

FIG. 3 is an enlarged cross-sectional view taken generally along line 3—3 of FIG. 1, and illustrates longitudinal edge portions of the lowermost web folded upon themselves prior to the introduction of the webs into a laminator.

FIG. 4 is an enlarged cross-sectional view taken generally along line 4—4 of FIG. 1 and illustrates the cross-sectional configuration of the web after passing through the laminator.

FIG. 5 is an enlarged sectional view taken generally along line 5—5 of FIG. 1, and illustrates the cross-sectional configuration of a severed laminated web and the uniform configuration of a roll of the laminated material.

FIG. 6 is a highly schematic perspective view of an apparatus for forming the completely laminated web into a tube, and illustrates the means for forming lapped longitudinal edges of the tube and heat-sealing the edges to form a longitudinal heat-sealed seam.

FIG. 7 is an enlarged cross-sectional view taken generally along line 7—7 of FIG. 6, and illustrates a folded longitudinal edge of one of the plies of the laminate material overlying and heat-sealed to an opposite longitudinal edge of the same ply.

FIG. 8 is an enlarged fragmentary cross-sectional view taken generally along line 8—8 of FIG. 9, and illustrates the heat-sealed seam of the tube after the latter has been formed into a pouch.

FIG. 9 is a perspective view of a pouch formed from the tube of FIG. 7, and illustrates longitudinal and transverse heal-seals hermetically closing the pouch.

FIG. 10 is a highly enlarged sectional view taken generally along line 10—10 of FIG. 9, and clearly illustrates the cross-sectional configuration of one of the transverse heat-seals of the pouch.

Referring first to FIG. 1 of the drawings, a novel apparatus constructed in accordance with this invention is generally referred to by the reference numeral 10, and comprises means (not shown) for supporting a plurality of rolls 11, 12 from which are drawn respective webs 13, 14. While only a pair of rolls 11, 12 and associated webs are illustrated in FIG. 1, it is to be understood that the pair of rolls, 11, 12 represent a minimum number and additional rolls may be provided depending upon the number of plies which are to constitute the completed laminated structure.

The web 13 has opposite longitudinal edge portions 15, 16 while the web 14 has similar opposite longitudinal edge portions 17, 18. The webs 13, 14 are drawn from the respective rolls 11, 12 with the edges 15, 17 and 16, 18, respectively, in adjacent overlying relationship, as is best illustrated in FIG. 2 of the drawings. The longitudinal edge portions 15 through 18 terminate at respective longitudinal free edges 20 through 23 (FIG. 2). The web 13 is wider than the web 14 (FIGS. 1 and 2), and the edges 20, 21 are equally spaced from the respective edges 22, 23. In this manner the longitudinal edge portions 15, 16 of the web 13 project transversely beyond or are transversely staggered relative to the respect longitudinal edge portions 17, 18 of the web 14.

The web 13 is constructed from material which is heat-sealable to itself but which will not heat-seal or cross-seal to the material of the web 14. For example, the web 13 can be cellophane while the web 14 can be low, medium or high density polyethylene. These materials cannot be heat sealed to one another i.e., cannot be cross-sealed to each other under conditions of elevated temperature and pressure, and in its broadest aspects this invention is directed to laminating any number of webs which will not heat-seal to each other but at least one of which will heat-seal to itself. However, since the invention is directed specifically to the production of containers, such as bags and pouches, the process will be described more fully hereafter in conjunction with materials which are widely used in the packaging industry.

The web 13 is preferably formed of cellophane having coatings 24, 29 (FIG. 2) of heat-sealable material applied to respective lower and upper surfaces thereof, such as a coating of nitrocellulose. For simplicity of disclosure the coating 29 is illustrated only in FIG. 2 of the drawings, but it is to be understood that the coating 29 is, in a preferred form of this invention, at all times present upon the upper surface of the web 13. However, the invention is equally applicable to a web, corresponding to the web 13, which has a coating of heat sealable material only on the lower surface thereof, such as the coating 24. In lieu of the nitrocellulose coating 24 a coating of saran or a polyethylene laminate may be employed in accordance with this invention. The web 13 may also be constructed from polyester material or glassine as the base or substrate materials provided with heat-sealable coatings, such as the coating 24. The web 13 may also be constructed from heat set oriented polypropylene having surfaces coated with heat sealable material.

The narrow web 14 is preferably constructed from low, medium or high density polyethylene, but cast polypropylene, oriented polypropylene, polyolefin copolymers ionomers, vinyls, or polyamides may serve as the material from which the web 14 is constructed.

For the purpose of this description, the material of the web 14 will be hereinafter considered to be polyethylene while the material of the web 13 will be assumed to be cellophane provided with a coating 24 of nitrocellulose.

The web 13 is drawn from left-to-right in FIG. 1 of the drawings through a conventional printer 25 at which time an upper surface 26 of the base or cellophane material is reverse printed with desirable indicia 27, 28 such as product or packager identification, instructions, etc. It is to be noted that the indicia 28 is rotated 180 degrees relative to the indicia 27 for a reason which will be more apparent hereafter.

The webs 13, 14 are guided by a plurality of rollers (unnumbered), many of which are not illustrated, toward a conventional adhesive or lacquer applying mechanism 30 which includes a roller 31 for applying a coating 32 of lacquer to the upper surface 26 of the web 13 (FIG. 2). The lacquer coating 32 is applied to the surface 26 at a time after the indicia or printing 27, 28 has thoroughly dried and no smearing or intermixing of the printing material and the lacquer occurs. The type lacquer used to join the webs 13, 14 varies with the particular materials from which the webs are constructed. However, for the various combinations of materials listed heretofore the adhesive could be, for example, any type of commercially available ethylene-vinyl acetate copolymer adhesive.

After the upper surface 26 of the web 13 has been coated, the webs 13, 14 pass beyond guide rolls 33, 34 toward a folding mechanism 35. As is best illustrated in FIG. 1 of the drawings, the web 14 is guided above the folding mechanism 35 while the web 13 is guided into and through the folding mechanism. During the passage of the web 13 through the folding mechanism 35, the longitudinal edges 15, 16 thereof are progressively guided into overlapped or folded relationship by folding wings 36, 37 until the terminal edges 20, 21 are in opposed relationship, as is best illustrated in FIG. 3 of the drawings. The folded longitudinal edges of the web 13 are generally referred to by the reference numerals 40, 41. Suitable conventional means, such as contoured rollers (not shown), maintain the longitudinal edges 40, 41 in folded relationship during the passage of the web 13 into and through a conventional laminating mechanism 45. As the web 13 is introduced into the laminating mechanism 45 the web 14 is guided by conventional edge guiding means (not shown), into contact with the lacquer coating 32, as is best illustrated in FIG. 3 of the drawings. The edges 21, 23 and 20, 22 are thus brought into opposed butt relationship. During the passage of the now superimposed webs 13, 14 through the laminator the heat and pressure bonds or laminates the webs 13, 14 together as well as laminating the folded longitudinal edge portions 40, 41 resulting in a laminated web generally referred to by the reference numeral 50 (FIG. 4).

The laminated web 50 is thereafter severed by a conventional slitting mechanism 51 (FIG. 1) which includes a rotary slitter or blade 52. The blade 52 severs the laminated web 50 along its medial or center line to form a pair of laminated webs 53, 54 having respective longitudinal edge portions 55, 56.

The laminated web 53 is wound into a roll 57 by a conventional winding mechanism 58 while the laminated web 54 is similarly wound into a roll 60 by a conventional winding mechanism 61.

After predetermined lengths of the laminated webs 53, 54 are wound upon the rolls 57, 60, the laminated webs 53, 54 are severed by conventional severing mechanisms, such as flying shears. Either of the rolls 57, 60 is then rewound (not shown) for a reason to be explained more fully hereafter. However, it is important to note that due to the generally uniform thickness of the webs 13, 14 and the folded over edges 40, 41, the rolls 57, 60 are of a uniform transverse cross-section throughout their lengths, as is readily apparent from the roll 60 illustrated in FIG. 5 of the drawings.

The laminated rolls 57, 60 are shipped to a packager for subsequent fabrication into pouches or similar containers in the manner schematically illustrated in FIG. 6 of the drawings. A laminated roll, such as the roll 57 of FIG. 6, is conventionally supported in an apparatus 65 which includes a forming mechanism 66. The web 53 is drawn through the forming mechanism 66 by conventional pull rolls (not shown). During the passage of the web 53 through the forming mechanism 66, forming wings (not shown) of the forming mechanism 66 progressively direct the folded longitudinal edge 41 into external overlying relationship to the longitudinal edge 55, as is best illustrated in FIG. 7 of the drawings. Heat and pressure is applied to the overlapped longitudinal edge portions 41, 55 by a conventional heat-sealing mechanism 67 and a tubular mandrel 68 to form a longitudinal heat-sealed seam, generally referred to by the reference numeral 70. The now longitudinally seamed tube, generally referred to by the reference character T, is filled with a product, such as potato chips, through the hollow mandrel 68. Simultaneously with the filling of the tube T transverse portions of the tube T are progressively heat-sealed as at 71, 72, 73, etc. Thereafter the transversely heat-sealed portions 71 through 73 are transversely severed by conventional means along the severance lines a, a to form a plurality of identical pouches, one of which is illustrated in FIG. 9 of the drawings and is generally referred to by the reference numeral 75.

The pouch or container 75 includes a body 76 heat-sealed longitudinally by the longitudinal seam 70 and heat-sealed transversely by identical transverse heat-sealed seams 77, 78.

As is best illustrated in FIG. 8 of the drawings, the overfolding of the folded longitudinal edge 41 upon the longitudinal edge 53 brings the heat-sealable coating 24 on each of the these edges in abutting contact and a heat-sealed joint is produced at an interface A thereof, upon the application of heat and pressure by the heat sealing mechanism 67 (FIG. 6). The width of the overlap between the longitudinal edge portions 41, 53, is substantially equal to or slightly less than the width of the folded edge 41. That is, the longitudinal edge portion 53 does not project beyond the longitudinal edge 21 in underlying relationship to the web 14, as illustrated in phantom outline in FIG. 8, since the coating 24 would not heat-seal to the material 14 and an undesirable passage would be formed at each of the transverse heat seals 77, 78. In this manner the pouch 75 is provided with a heat seal at the interface A even though the materials 13, 14 are not cross-sealed i.e., cannot be heat-sealed to one another.

Each of the transversely heat-sealed end portions 77, 78 is identical, and a description of the heat-sealed end portion 78 (FIG. 10) is believed sufficient for a full understanding of this invention. As was heretofore noted, the web 14 is constructed of heat-sealable material such as low, medium or high density polyethylene, and upon the application of heat and pressure to the edge portion 78 a transverse heat seal is formed at the interface B of the inner web 14. Here again, the transverse heat seal at the interface B is effected even though the materials 13, 14 are not heat-sealable to each other.

While a preferred method of forming a laminated web has been heretofore described, various modifications in the method are considered to be within the scope of this invention. For example, the apparatus 10 has been described as being capable of folding the longitudinal edges 15, 16 of the web 13 after which the web 14 is guided between the opposed longitudinal edges 20, 21 (FIG. 3). However, in accordance with this invention, the webs 13, 14 can be united prior to the folding of the longitudinal edges 15, 16 and thereafter both webs 13, 14 can be fed through the folding mechanism 35 at which time the edges 15, 16 would be folded into abutting relationship with the respective edges 22, 23 of the web 14.

It is also considered within the scope of this invention to fold only one of the longitudinal edges 15, 16 of the web 13 to form a single laminated web corresponding to either of the webs 53, 54 in the absence of a severing operation performed by the slitting mechanism 51. In this case suitably dimensioned webs corresponding to the webs 13, 14 would be fed by the apparatus 10 with the longitudinal edges 20, 22 in coplanar relationship. Thereafter the longitudinal edge 15 would be folded in the manner heretofore described to form a laminated web having but one folded longitudinal edge portion, as opposed to the pair of longitudinal folded edge portions 40, 41 of the web 50.

An advantage of forming a laminated web in the manner just described is the elimination of rewinding one of a pair of rolls, as in the case of the rolls 57, 60. When the web 57 is drawn through the forming mechanism 66 (FIG. 6) the longitudinal edge 41 is overlapped upon the longitudinal edge 55, as was heretofore described. However, if the web 54 of the roll 60 is similarly fed through the forming mechanism 66 without rewinding the edge 56 would be overlapped upon the edge 40 and no longitudinal heat-seal could be effected upon the operation of the heat-sealing mechanism 67. It is for this reason that the roll 60 is rewound and that the indicia 27 is rotated 180 degrees with respect to the indicia 28.

It is also considered within the scope of this invention to form a laminated web corresponding to the laminated web (FIG. 4) by initially feeding a web of material, corresponding to the web 14, which is somewhat wider than the distance between the opposing longitudinal edges 20, 21 of the web 13 (FIG. 3). In this case a web having a width W (FIG. 3) is applied to the web 13 with one or both edges overlapping the folded longitudinal edges 40, 41 of the web 13. Tension is then applied to the web 14 between the roller 33 (FIG. 1) and rollers (not shown) in the laminator 45. Under the application of such tension and the heat of the laminator 45 the web 14, which is constructed of polyethylene or similar material, will elongate lengthwise and reduce or shrink in width until the width thereof corresponds to the distance between the opposed edges 20, 21 of the web 13. By regulating the amount of tension and heat applied to the web 14 prior to the lamination thereof to the web 13 the web 14 can be accurately positioned from the initial overlapped relationship to the position illustrated in FIG. 4 of the drawings.

From the foregoing, it will be seen that novel and advantages provisions have been made for carrying out the desired end. However, attention is again directed to the fact that additional variations may be made in this invention without departing from the spirit and scope thereof as defined in the appended claims.

We claim:

1. An article of manufacture comprising first and second sheets having respective first and second surfaces defining an interface thereof, said sheets being joined to each other along said interface, said first sheet having an edge portion projecting beyond an edge of said second sheet, said first sheet being readily heat-sealable to itself, said edge portion being directly folded upon itself and terminating in an edge in opposed relationship to the edge of said second sheet, said folded edge portion being secured at an interface defined by opposed surfaces thereof, said sheet being in the form of a roll, said roll is of a substantially uniform diameter at both opposite axial ends thereof, and said folded edge portion being disposed circumferentially at an axial end portion of said roll.

2. An article of manufacture comprising first and second sheets having respective first and second surfaces defining an interface thereof, said sheets being joined to each other along said interface, said first sheet having an edge portion projecting beyond an edge of said second sheet, said first sheet being readily heat-sealable to itself but being generally noncross-heat-sealable to said second sheet, said edge portion being directly folded upon itself and terminating in an edge in opposed relationship to the edge of said second sheet, said folded edge portion being secured at an interface defined by opposed surfaces thereof, wherein said sheets are in the form of a roll, said roll is of a substantially uniform diameter at both opposite axial ends thereof, and said folded edge portion is disposed circumferentially at an axial end portion of said roll.

3. An article of manufacture comprising first and second sheets having respective first and second surfaces defining an interface thereof, said sheets being joined to each other along said interface, said first sheet having an edge portion projecting beyond an edge of said second sheet, said first sheet being readily heat-sealable to itself but being generally noncross-heat-sealable to said second sheet, said edge portion being directly folded upon itself and terminating in an edge in opposed relationship to the edge of said second sheet, said folded edge portion being secured at an interface defined by opposed surfaces thereof, said first sheet being a laminated structure comprised of a substrate and a film coating of a heat-sealable material with the coating being partially defined by said first surface, said sheets are in the form of a roll, said roll is of a substantially uniform diameter at both opposite axial ends thereof, and said folded edge portion is disposed circumferentially at an axial end portion of said roll.

4. A seamed tube comprising first and second sheets of generally identical peripheral configurations and thicknesses having respective first and second surfaces defining an interface thereof, said sheets being joined to each other along said interface to define a composite sheet, said first sheet having an edge portion projecting beyond an edge of said second sheet, said edge portion being folded upon and secured to itself, said edge portion terminating in an edge in opposed relationship to the edge of said second sheet, said folded edge portion defining one edge of said composite sheet, said composite sheet including another edge remote from said one edge, said another and folded edge portions being of a generally identical thickness, said one and another edges being in overlapped relationship with portions of said first sheet at said one and another edge being in adjacent relationship, means securing said first sheet adjacent portions to each other, said tubular composite sheet is closed at a transverse end portion thereof by a transverse heat seal between opposed portions of said second sheet.

5. A seamed tube comprising first and second sheets of generally identical peripheral configurations and thicknesses having respective first and second surfaces defining an interface thereof, said sheets being joined to each other along said interface to define a composite sheet, said first sheet having an edge portion projecting beyond an edge of said second sheet, said edge portion being folded upon and secured to itself, said edge portion terminating in an edge in opposed relationship to the edge of said second sheet, said folded edge portion defining one edge of said composite sheet, said composite sheet including another edge remote from said one edge, said another and folded edge portions being of a generally identical thickness, said one and another edges being in overlapped relationship with portions of said first sheet at said one and other edges being in adjacent relationship, means securing said first sheet adjacent portions to each other, said first sheet is of a heat sealable nature, and said first sheet is readily heat-sealable to itself but is not readily heat-sealable to said second sheet.

6. A method of laminating at least two webs comprising the steps of providing first and second generally identically thick webs each having first and second longitudinal edge portions, uniting the first and second webs with the first longitudinal edge portion of the first web projecting beyond the first longitudinal edge portion of the second web and with free terminal edges of the second longitudinal edge portion of the first and second webs in a common plane, folding the projecting longitudinal edge portion of the first web directly upon itself with a free edge of the latter opposing a free edge of the first longitudinal edge portion of the second web, and securing the folded longitudinal edge portion to itself.

7. A method of laminating at least two webs comprising the steps of providing first and second webs each having first and second longitudinal edge portions terminating at respective free first and second longitudinal edges, folding the first and second longitudinal edge portions of the first web upon themselves with the respective first and second free longitudinal edges in opposing relationship to the respective first and second free longitudinal edges of the second web, and securing said folded longitudinal edge portions at the interface of each fold.

8. The method of laminating as defined in claim 7 including the step of longitudinally separating the laminated webs to form two laminated web portions.

9. The method of laminating defined in claim 8 including the steps of forming the web portions into a roll with each of the folded longitudinal edge portions disposed circumferentially about and located adjacent an axial end portion of its associated roll.

10. A method of laminating at least two webs comprising the steps of providing first and second webs each having respective first and second longitudinal edge portions terminating in free longitudinal first and second edges, folding the longitudinal edge portions of the first web upon themselves with the edges thereof in opposing relationship, assembling the first and second webs in overlying relationship with the first and second longitudinal edges of the second web projecting transversely beyond the respective first and second edges of the first web, transversely foreshortening the second web whereby the first and second edges thereof are brought into opposing abutting relationship to the respective first and second edges of the first web, and thereafter securing the webs to each other.

11. The method of laminating as defined in claim 10 including the step of longitudinally separating the laminated webs to form two laminated web portions each of which includes a folded longitudinal edge portion.

12. A method of laminating at least two webs comprising the steps of providing a first web of material crosssealable to itself but not to a second web, each of said first and second webs having first and second longitudinal edge portions terminating in free longitudinal first and second edges, uniting the first and second webs with the first longitudinal edge portion of the first web projecting beyond the first longitudinal edge of the second web, folding the projecting longitudinal edge portion of the first web directly upon itself with the free edge thereof opposing the first free edge of the second web, securing the folded longitudinal edge portion to itself, and rolling the laminated webs into a roll of a substantially uniform diameter at both axially opposite ends thereof.

13. A method of laminating at least two webs comprising the steps of providing first and second webs of different material, each of the first and second webs having first and second longitudinal edge portions terminating in free longitudinal first and second edges, assembling the first and second webs with the first longitudinal edge portion of the first web projecting beyond the first longitudinal edge of the second web, folding the projecting longitudinal edge portion of the first web directly upon itself with the free edge thereof opposing the first free edge of the second web, laminating the folded longitudinal edge portion to itself and opposing portions of the first and second webs to each other, and rolling the laminated webs into a roll of a substantially uniform diameter at both axially opposite ends thereof.

14. The method of laminating as defined in claim 13 wherein said first web is a film coating of heat sealable material.

15. A method of laminating at least two webs comprising the steps of providing first and second webs of different material, each of the first and second webs having first and second longitudinal edge portions terminating in free longitudinal first and second edges, assembling the first and second webs with the first longitudinal edge portion of the first web projecting beyond the first longitudinal edge of the second web, folding the projecting longitudinal edge portion of the first web directly upon itself with the free edge thereof opposing the first free edge of the second web, laminating the folded longitudinal edge portion to itself and opposing portions of the first and second webs to each other, said first web is a laminated structure and includes coatings of heat sealable material applied to opposite surfaces of a substrate.

16. A method of laminating at least two webs comprising the steps of providing first and second webs of different material, each of the first and second webs having first and second longitudinal edge portions terminating in free longitudinal first and second edges, assembling the first and second webs with the first longitudinal edge portion of the first web projecting beyond the first longitudinal edge of the second web, folding the projecting longitudinal edge portion of the first web directly upon itself with the free edge thereof opposing the first free edge of the second web, laminating the folded longitudinal edge portion to itself and opposing portions of the first and second webs to each other, said first web is a laminated structure of heat sealable coated cellophane, and the second web is polyolefin material.

17. A method of laminating at least two webs comprising the steps of providing first and second webs each having respective first and second longitudinal edge portions terminating in free longitudinal first and second edges, folding the longitudinal edge portions of the first web upon themselves with the edges thereof in opposing relationship, applying adhesive to one of the webs, assembling the first and second webs in overlying relationship with the first and second longitudinal edges of the second web projecting transversely beyond the respective first and second edges of the first web transversely foreshortening the second web whereby the first and second edges thereof are brought into opposing butt relationship to the respective first and second edge of the first web, and thereafter securing said webs to each other by applying heat and pressure thereto.

18. A laminated container comprising container body formed of at least two sheets of material neither of which is paperboard and one of which is readily heat sealable to itself, said sheets having first and second longitudinal edge portions terminating in respective first and second free longitudinal edges, the first longitudinal edge portion of the first sheet being folded directly upon itself with the edge thereof in opposed relationship to the first edge of the second sheet, a first seal of a predetermined bond strength maintaining said folded edge portion folded, the second longitudinal edge portion of the first sheet being in lapped relationship to said folded edge portion, a heat seal of a predetermined bond strength securing said lapped portions together, a second heat seal closing a transverse end portion of said body, and said second heat seal being formed at an interface of only said second sheet.

19. The laminated container as defined in claim 18 wherein the amount of lap of the second and folded edge portions of the first sheet is no greater than the amount of fold of the folded edge portion.

20. The laminated container as defined in claim 18 wherein the amount of lap of the second and folded edge portions of the first sheet is no greater than the amount of fold of the folded edge portion.

21. A laminated container comprising a container body formed of at least two sheets of generally identical thicknesses one of which is readily heat-sealable to itself but not cross-sealable to the other, said sheets having first and second longitudinal edge portions terminating in respective first and second free longitudinal edges, the first longitudinal edge portion of the first sheet being folded directly upon itself with the edge thereof in opposed relationship to the first edge of the second sheet, a first seal of a predetermined bond strength maintaining said folded edge portion folded, the second longitudinal edge portion of the first sheet being in lapped relationship to said folded edge portion, a heat seal of a predetermined bond strength securing said lapped portions together, means closing one end portion of said body, neither of said sheets being of paper stock material, and said first sheet defines an outer ply of said container body.

References Cited

UNITED STATES PATENTS

| | | | |
|---|---|---|---|
| 3,130,649 | 4/1964 | Striplin et al. | 229—14 |
| 3,235,168 | 2/1966 | Nichols | 229—55 |
| 3,242,829 | 3/1966 | White | 229—4.5 |
| 3,259,301 | 7/1966 | Onasch | 229—55 |

DONALD F. NORTON, Primary Examiner

U.S. Cl. X.R.

156—192, 201, 218; 161—102, 104; 206—59; 229—4.5, 48